United States Patent

Shimamura et al.

(10) Patent No.: US 8,771,883 B2
(45) Date of Patent: Jul. 8, 2014

(54) ALKALINE BATTERY

(75) Inventors: Harunari Shimamura, Osaka (JP);
Koshi Takamura, Osaka (JP);
Nobuharu Koshiba, Nara (JP)

(73) Assignee: Panasonic Corporation, Osaka (JP)

( * ) Notice: Subject to any disclaimer, the term of this patent is extended or adjusted under 35 U.S.C. 154(b) by 771 days.

(21) Appl. No.: 13/073,373

(22) Filed: Mar. 28, 2011

(65) Prior Publication Data

US 2011/0171524 A1 Jul. 14, 2011

Related U.S. Application Data

(62) Division of application No. 10/588,061, filed as application No. PCT/JP2005/004782 on Mar. 17, 2005, now abandoned.

(30) Foreign Application Priority Data

May 13, 2004 (JP) ................................. 2004-143430

(51) Int. Cl.
*H01M 4/42* (2006.01)
*H01M 10/26* (2006.01)
*H01M 6/04* (2006.01)

(52) U.S. Cl.
USPC ............................ 429/406; 429/206; 429/229

(58) Field of Classification Search
USPC ........................ 429/406, 501, 206, 207, 229
See application file for complete search history.

(56) References Cited

U.S. PATENT DOCUMENTS

| 4,225,657 | A | * | 9/1980 | Klein et al. .................... 429/248 |
| 5,721,072 | A | | 2/1998 | Mototani et al. |
| 6,265,105 | B1 | | 7/2001 | Tokuda et al. |
| 7,049,030 | B2 | | 5/2006 | Eylem et al. |
| 7,160,647 | B2 | * | 1/2007 | Eylem et al. .................... 429/220 |
| 2003/0113630 | A1 | * | 6/2003 | Kainthla et al. ............... 429/231 |

FOREIGN PATENT DOCUMENTS

| CN | 1147159 A | 4/1997 |
| JP | 05-135776 | 6/1993 |
| JP | 2000-082503 | 3/2000 |
| JP | 2002-501287 | 1/2002 |
| JP | 2004-014306 | 1/2004 |
| WO | WO 99/35704 | 7/1999 |
| WO | WO 2004/082093 A2 | 9/2004 |
| WO | WO 2005/064709 A1 | 7/2005 |

OTHER PUBLICATIONS

European Search Report issued in European Patent Application No. 05726651.2-2119, mailed Jan. 26, 2010.

* cited by examiner

*Primary Examiner* — Tracy Dove
(74) *Attorney, Agent, or Firm* — McDermott Will & Emery LLP

(57) ABSTRACT

An alkaline battery of this invention includes: a negative electrode including a negative electrode mixture that contains a zinc alloy as an active material, the zinc alloy containing at least aluminum; an alkaline electrolyte; and a positive electrode. The alkaline electrolyte includes an aqueous KOH solution and LiOH and an aluminum compound that are dissolved in the aqueous KOH solution. The alkaline battery has excellent high-rate discharge characteristics.

2 Claims, 2 Drawing Sheets

F I G. 1
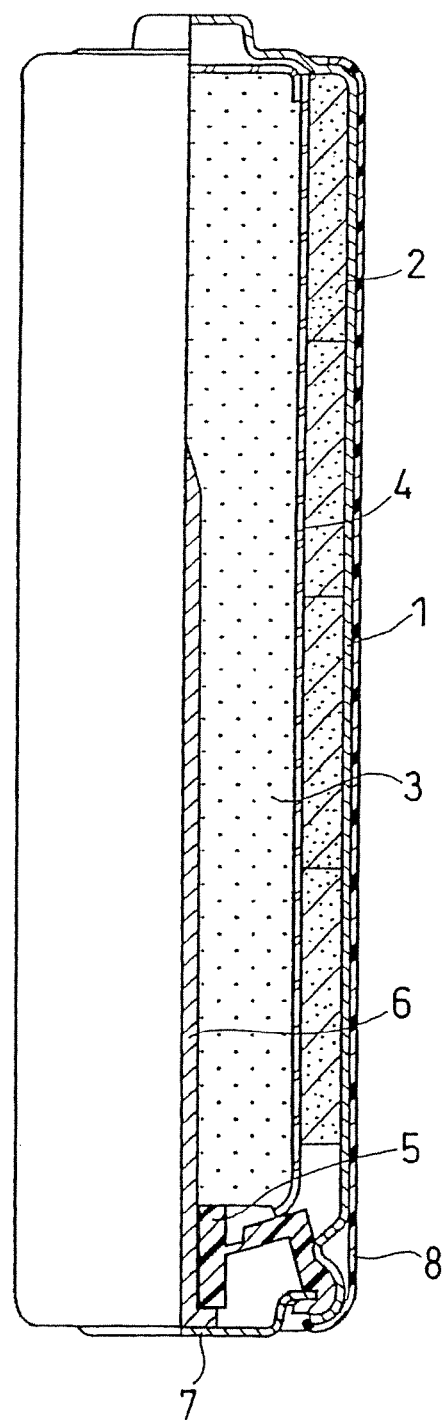

F I G. 2
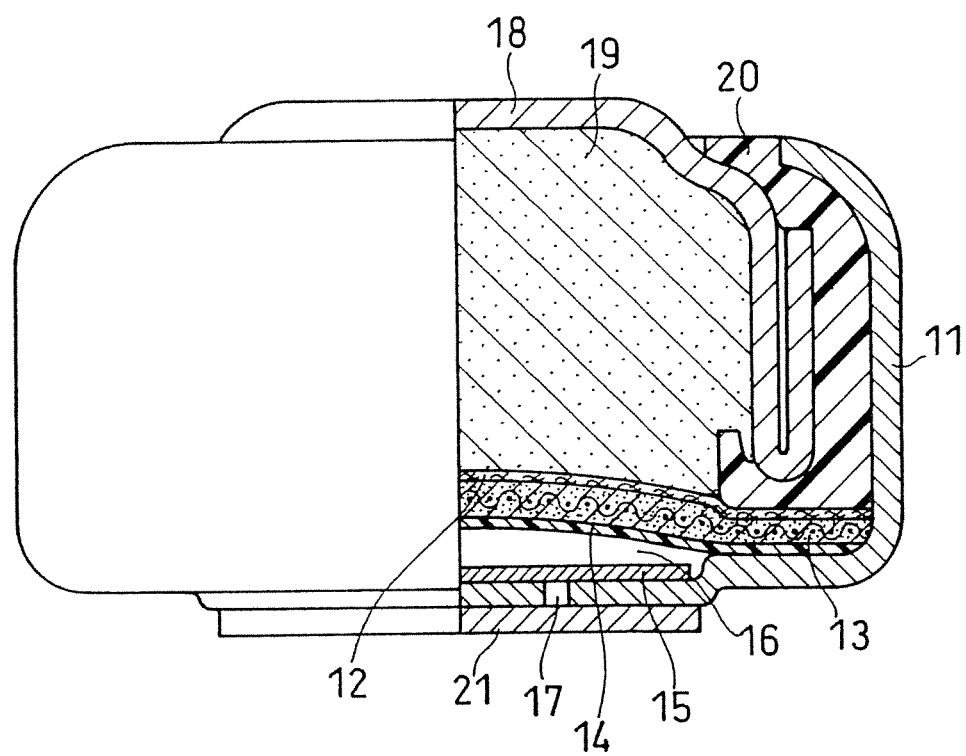

ALKALINE BATTERY

RELATED APPLICATIONS

This application is a Divisional of U.S. patent application Ser. No. 10/588,061, filed on Aug. 1, 2006, now abandoned which is a U.S. National Phase under 35 U.S.C. §371 of International Application No. PCT/JP2005/004782, filed on Mar. 17, 2005, which in turn claims the benefit of Japanese Application No. 2004-143430, filed on May 13, 2004, the disclosures of which Applications are incorporated by reference herein.

TECHNICAL FIELD

The present invention relates to alkaline batteries such as alkaline dry batteries and air batteries, and, more particularly, to an improvement in the alkaline electrolyte to prevent gas production and improve high-rate discharge characteristics.

BACKGROUND ART

A conventional problem with alkaline batteries using zinc or a zinc alloy as a negative electrode active material is that the active material corrodes in an alkaline electrolyte to produce hydrogen gas. Accumulation of this gas in the battery increases the battery inner pressure, thereby causing the electrolyte to leak out, which is disadvantageous.

To solve this problem, various techniques have been examined. Patent Document 1 discloses that adding lithium hydroxide to an electrolyte decreases the reactivity of the electrolyte with the surface of an active material powder, thereby reducing the amount of gas produced.

Patent Document 1: Japanese Laid-Open Patent Publication No. Hei 2000-82503

DISCLOSURE OF INVENTION

Problem that the Invention is to Solve

However, in the case of a zinc alloy containing at least aluminum, even if LiOH is added to an alkaline electrolyte, a large amount of aluminum is dissolved in the electrolyte. Thus, there is a problem in that the addition of LiOH does not produce the effect of suppressing gas production from zinc, thereby resulting in degradation of high-rate discharge characteristics of the battery. The reason why the addition of LiOH suppresses gas production is probably that $Zn(OH)_4^{2-}$ produced during discharge is prevented from changing into a passivation film on the active material surface and that a conductive film comprising Zn, O, and K is formed. However, in the case of using an aluminum-containing zinc alloy as a negative electrode active material, part of this conductive film is destroyed when the aluminum in the alloy is dissolved in an electrolyte. Hence, the zinc alloy is exposed at the surface, so that gas production cannot be sufficiently suppressed. As a result, a passivation film is formed to increase the resistance, thereby leading to a significant degradation of discharge characteristics, particularly high-rate discharge characteristics.

Means for Solving the Problem

In order to solve the above-mentioned problems, the present invention is directed to an alkaline battery including: a negative electrode including a negative electrode mixture that contains a zinc alloy as an active material, the zinc alloy containing at least aluminum; an alkaline electrolyte; and a positive electrode. The alkaline electrolyte includes an aqueous KOH solution and LiOH and an aluminum compound that are dissolved in the aqueous KOH solution.

According to this configuration, the aluminum in the negative electrode active material can be prevented from dissolving into the electrolyte, and the LiOH in the electrolyte can produce the effect of preventing $Zn(OH)_4^{2-}$ produced during discharge from depositing onto the active material surface as ZnO. That is, the LiOH added to the electrolyte suppresses formation of a passivation film (ZnO) on the zinc alloy surface during discharge, so that a conductive film comprising Zn, O, and K is formed. Also, the aluminum compound suppresses dissolution of the aluminum in the zinc alloy into the electrolyte. Accordingly, it is possible to improve the discharge characteristics, particularly high-rate discharge characteristics, of the battery.

If the amounts of LiOH and aluminum compound in the negative electrode mixture are less than 0.1 wt % and less than 0.001 wt %, respectively, relative to the whole amount of the negative electrode mixture, the dissolution of aluminum from the zinc alloy is not suppressed, and the addition of LiOH is not effective. Also, if the amounts of LiOH and aluminum compound are more than 2 wt % and 0.2 wt %, respectively, relative to the whole amount of the negative electrode mixture, it is difficult to maintain the pH of the electrolyte at a constant level among lots due to the influence of carbon dioxide, etc., depending on the management condition.

Therefore, in order to ensure the effects obtained by the addition of LiOH and the aluminum compound and improve the discharge characteristics, particularly high-rate discharge characteristics, of the battery, it is preferred that the amounts of LiOH and aluminum compound contained in the electrolyte in the negative electrode mixture be in the range of 0.1 to 2 wt % and in the range of 0.001 to 0.2 wt %, respectively, relative to the whole negative electrode mixture. As used therein, the negative electrode mixture refers to a mixture of the active material zinc alloy and the electrolyte, and if the electrolyte is gelled, the negative electrode mixture contains a gelling agent.

Further, if the weight ratio of the whole electrolyte (i.e., the electrolyte contained in the entire battery, not the electrolyte contained in the negative electrode mixture) to the weight of the active material zinc alloy is less than 0.1, the concentration of $Zn(OH)_4^{2-}$ around the zinc alloy sharply increases, so that the addition is not effective and the high-rate discharge characteristics of the battery deteriorates. Also, if this weight ratio is greater than 2, the ratio of the electrolyte to the negative electrode mixture increases excessively, so that the amount of active material powder in the negative electrode mixture decreases, thereby resulting in a decrease in battery capacity. It is therefore preferred that the weight ratio of the whole alkaline electrolyte to the zinc alloy of the negative electrode mixture be in the range of 0.1 to 2.

With respect to the composition of the zinc alloy, if an element selected from the group consisting of bismuth, indium, calcium, tin, and lead, which have high hydrogen overvoltages, is contained in addition to aluminum, the effect of suppressing gas production increases.

Also, exemplary aluminum compounds added include those soluble in the alkaline aqueous solution, such as $Al(OH)_3$ and aluminate. They are believed to exist in the electrolyte as aluminate ions $(Al(OH)_4(H_2O)_2^-, Al(OH)_6(H_2O)^{3-}$, etc).

Effects of the Invention

The present invention can optimize the relation between the zinc alloy and the electrolyte and improve both electrolyte-leakage resistance and high-rate discharge characteristics of the battery.

BRIEF DESCRIPTION OF DRAWINGS

FIG. 1 is a partially sectional front view of an alkaline dry battery according to Embodiment 1 of the present invention; and FIG. 2 is a partially sectional front view of an air battery according to Embodiment 2 of the present invention.

BEST MODE FOR CARRYING OUT THE INVENTION

Embodiments of the present invention are hereinafter described with reference to drawings.

Embodiment 1

The structure of an alkaline dry battery is described with reference to FIG. 1, which is a partially sectional front view.

A battery case 1 contains a positive electrode mixture 2 in the form of short cylindrical pellets, a separator 4, and a gelled negative electrode mixture 3. The battery case 1 may be a steel case whose inner face is plated with nickel. A plurality of the positive electrode mixture pellets 2 are contained in the battery case 1 so as to closely adhere to the inner face thereof. The separator 4 is placed on the inner side of the positive electrode mixture 2, and the gelled negative electrode mixture 3 is filled in the space on the inner side of the separator 4.

The positive electrode mixture 2 is prepared as follows. First, manganese dioxide, graphite, and an electrolyte are mixed together in a weight ratio of 90:6:1. The resultant mixture is sufficiently stirred and then compression molded into flakes. Subsequently, the positive electrode mixture flakes are crushed to obtain positive electrode mixture granules, and the positive electrode mixture granules are then classified with a sieve to obtain granules of 10 to 100 mesh. The resultant granules are compression molded into hollow cylinders to obtain the positive electrode mixture pellets 2. Four positive electrode mixture pellets 2 are inserted into the battery case 1, and the positive electrode mixture 2 is again molded by means of a compressing device so as to closely adhere to the inner wall of the battery case 1.

The separator 4, which is a cylinder with a bottom, is placed in the middle of the positive electrode mixture 2 that is placed in the battery case 1 in the above manner, and a predetermined amount of an alkaline electrolyte is injected into the space on the inner side of the separator 4. After the lapse of a predetermined time, the gelled negative electrode mixture 3, which comprises the alkaline electrolyte, a gelling agent, and a zinc alloy powder, is filled into the space on the inner side of the separator 4. The gelled negative electrode mixture 3 used is composed of 1 part by weight of sodium polyacrylate serving as the gelling agent, 33 parts by weight of the alkaline electrolyte, and 66 parts by weight of the zinc alloy powder. Also, the separator 4 used is a 220-μm-thick non-woven fabric composed of polyvinyl alcohol fibers and rayon fibers in a weight ratio of 7:10. The density of the separator is 0.30 g/cm$^3$, and the size of the separator fibers is 0.3 denier. The ratio of the fibers is not limited to this, and other fibers may be added as a binder.

Subsequently, a negative electrode current collector 6 is inserted into the middle of the gelled negative electrode mixture 3. The negative electrode current collector 6 is integrally combined with a gasket 5 and a bottom plate 7 serving as the negative electrode terminal. The open edge of the battery case 1 is crimped onto the circumference of the bottom plate 7 with the edge of the gasket 5 interposed therebetween, to seal the opening of the battery case 1. Lastly, the outer face of the battery case 1 is covered with an outer label 8.

The electrolyte used is an alkaline electrolyte prepared by dissolving KOH in water. The KOH concentration of the alkaline electrolyte is 30 wt % to 45 wt %. In order to suppress the self-discharge of zinc, ZnO may be dissolved in the electrolyte, and with respect to the dissolution amount, ZnO may be dissolved until it becomes saturated at each alkali concentration. To reduce the production of hydrogen gas, an organic anti-corrosive agent may be dispersed in the electrolyte. The LiOH and aluminum compound contained in the negative electrode mixture are preferably added to the electrolyte at concentrations of 0.34 to 7.0 wt % and 0.0034 to 0.070 wt %, respectively.

Any organic anti-corrosive agent may be used as long as it suppresses the production of hydrogen, and an example is fluoroalkyl polyoxyethylene (trade name: Surflon #S-161). Also, the electrolyte may be in the state of gel. Any gelling agent may be used if it combines with the alkaline electrolyte to form gel, and examples other than sodium polyacrylate include carboxymethyl cellulose, polyvinyl alcohol, polyethylene oxide, polyacrylic acid, sodium polyacrylate, chitosan gel, and modified materials thereof obtained by changing the polymerization reaction, cross-linking degree, or molecular weight.

With respect to the foam of the zinc alloy, for example, powder, a porous material obtained by sintering the powder, or a plate is effective. A zinc alloy powder can be obtained by synthesis from predetermined amounts of constituent elements by atomization and classification of the synthesized alloy. In addition to Zn, the zinc alloy contains Al, or contains Al and at least one element selected from the group consisting of Bi, In, Ca, Sn, and Pb. The suitable contents of other elements than Zn in the zinc alloy are 20 to 5000 ppm.

A porous zinc alloy obtained by sintering a zinc alloy powder is prepared by molding or hot-pressing a zinc alloy powder into pellets and sintering them in a reducing atmosphere in the range of 350 to 500° C.

A zinc alloy plate is prepared by forming lumps of a zinc alloy into a plate by using a roll press or the like. The thickness of this plate is arbitrarily adjusted so as to conform to the battery case. The plate surface may be flat, irregular due to punching, or perforated with through-holes.

Embodiment 2

The structure of an air battery is described with reference to FIG. 2. FIG. 2 is a partially sectional front view of an air battery. FIG. 2 illustrates the structure immediately after the fabrication; due to discharge, zinc in the negative electrode changes to a zinc oxide and undergoes a volume expansion, so that the space in an air diffusion chamber 16 changes to a size that is so large as to accommodate only an air diffusion paper 15.

A case serving as the positive electrode terminal is represented by numeral 11 and contains a separator 12, an air electrode 13 and a water-repellent film 14 on the bottom. Under them is the air diffusion chamber 16 for accommodating the air diffusion paper 15. The water-repellent film 14 allows oxygen to be supplied to the air electrode 13 and prevents an electrolyte from leaking out of the battery. The air diffusion paper 15 permits uniform diffusion of air that is introduced from an air vent 17 in the bottom of the case 11 into the case.

A sealing plate 18 serving as the negative electrode terminal contains a negative electrode mixture 19 comprising a zinc alloy powder and an electrolyte, and a ring-shaped insulating gasket 20 is fitted to the periphery thereof. The sealing plate is combined with the case 11, and the edge of the case 11 is crimped onto the sealing plate with the insulating gasket 20 therebetween, to seal the power generating element. Seal paper 21 affixed to the outer bottom face of the case closes the air vent 17 when the battery is not used, thereby blocking the entrance of air and preventing battery deterioration due to self-discharge. The air electrode 13 is produced by bonding a catalyst composition mainly composed of a metal oxide such as manganese dioxide, graphite, activated carbon, and a fluorocarbon binder to a current collector net under pressure.

EXAMPLES

Examples of the present invention are hereinafter described.

Example 1

AA-type alkaline dry batteries and coin-type PR2330 air batteries as described in Embodiments 1 and 2 were fabricated and evaluated for their characteristics.

As shown in Table 1, the zinc alloys of these negative electrodes are alloys containing Al or containing Al and one or more elements selected from the group consisting of Bi, In, Ca, Sn, and Pb, and there are three forms: powder, porous sintered material, and plate. Also, as shown in Table 2, the electrolytes used were 34 wt % aqueous KOH solutions to which LiOH and Al(OH)$_3$ were added in various ratios. These electrolytes contain 1.5 wt % of ZnO dissolved therein. The contents of Al and other elements in the negative electrode zinc alloy are as follows.

Al;5 to 70 ppm, Bi;50 to 400 ppm, In;100 to 800 ppm, Ca;2 to 50 ppm, Sn;10 to 400 ppm, Pb;2 to 50 ppm.

TABLE 1

| Material | Element added to zinc | Zinc form |
|---|---|---|
| A1 | Al | Powder |
| A2 | Al and Bi | Powder |
| A3 | Al and In | Powder |
| A4 | Al and Ca | Powder |
| A5 | Al and Sn | Powder |
| A6 | Al and Pb | Powder |
| A7 | Al, Bi and In | Powder |
| A8 | Al, In and Ca | Powder |
| A9 | Al, Sn and Pb | Powder |
| A10 | Al, Bi, In and Ca | Powder |
| A11 | Al, Bi, In and Sn | Powder |
| A12 | Al, Bi, In and Pb | Powder |
| A13 | Al, Bi, In, Ca and Sn | Powder |
| A14 | Al, Bi, In, Ca, Sn and Pb | Powder |
| B1 | Al | Porous sintered material |
| B2 | Al and Bi | Porous sintered material |
| B3 | Al and In | Porous sintered material |
| B4 | Al and Ca | Porous sintered material |
| B5 | Al and Sn | Porous sintered material |
| B6 | Al and Pb | Porous sintered material |
| B7 | Al, Bi and In | Porous sintered material |
| B8 | Al, In and Ca | Porous sintered material |
| B9 | Al, Sn and Pb | Porous sintered material |
| B10 | Al, Bi, In and Ca | Porous sintered material |
| B11 | Al, Bi, In and Sn | Porous sintered material |
| B12 | Al, Bi, In and Pb | Porous sintered material |
| B13 | Al, Bi, In, Ca and Sn | Porous sintered material |
| B14 | Al, Bi, In, Ca, Sn and Pb | Porous sintered material |
| C1 | Al | Plate |
| C2 | Al an Bi | Plate |
| C3 | Al and In | Plate |
| C4 | Al and Ca | Plate |
| C5 | Al and Sn | Plate |
| C6 | Al and Pb | Plate |
| C7 | Al, Bi and In | Plate |
| C8 | Al, In and Ca | Plate |
| C9 | Al, Sn and Pb | Plate |
| C10 | Al, Bi, In and Ca | Plate |
| C11 | Al, Bi, In and Sn | Plate |
| C12 | Al, Bi, In and Pb | Plate |
| C13 | Al, Bi, In, Ca and Sn | Plate |
| C14 | Al, Bi, In, Ca, Sn and Pb | Plate |

The respective batteries were placed in a constant temperature oven at 20° C. and a relative humidity of 60%. The air batteries were discharged at a current of 160 mA, and the alkaline dry batteries were discharged at a current of 1 A, whereby the discharge capacity C1 (mAh) was obtained. Also, the theoretical capacity C2 (mAh) was calculated from the weight of Zn contained in the negative electrode of each battery. The proportion P (%) of the discharge capacity C1 to the theoretical capacity C2 was calculated from the following formula (1), to evaluate the high-rate discharge characteristics of each battery. The higher P value a battery has, the better high-rate discharge characteristics the battery has. Also, to obtain battery capacity, the air batteries were discharged at a current of 3 mA and the alkaline dry batteries were discharged at a current of 50 mA. Table 2 shows the results. In the following Table 2 and Table 3, the wt % of LiOH and Al(OH)$_3$ represents the ratio relative to the negative electrode mixture.

$$P(\%) = (C1/C2) \times 100 \tag{1}$$

TABLE 2

| | Electrolyte additive | | Air battery | | Alkaline dry battery | |
|---|---|---|---|---|---|---|
| Material | LiOH (wt %) | Al(OH)$_3$ (wt %) | P(%) | Discharge capacity (mAh) | P(%) | Discharge capacity (mAh) |
| A1 | 0 | 0 | 45 | 855 | 46 | 2223 |
| A2 | 0.01 | 0.0001 | 62 | 865 | 63 | 2249 |
| A3 | 0.05 | 0.0005 | 64 | 875 | 65 | 2275 |
| A4 | 0.08 | 0.0008 | 65 | 899 | 66 | 2337 |
| A5 | 0.1 | 0.001 | 91 | 920 | 93 | 2392 |
| A6 | 0.2 | 0.005 | 93 | 925 | 95 | 2405 |
| A7 | 0.8 | 0.01 | 91 | 922 | 93 | 2397 |
| A8 | 1 | 0.05 | 92 | 919 | 94 | 2389 |
| A9 | 1.3 | 0.1 | 89 | 930 | 91 | 2418 |
| A10 | 1.5 | 0.15 | 88 | 925 | 90 | 2405 |
| A11 | 1.8 | 0.18 | 87 | 915 | 89 | 2379 |
| A12 | 2 | 0.2 | 86 | 905 | 88 | 2353 |
| A13 | 2.5 | 0.25 | 66 | 878 | 67 | 2283 |
| A14 | 3 | 0.3 | 62 | 869 | 63 | 2259 |
| B1 | 0 | 0 | 46 | 860 | 47 | 2236 |
| B2 | 0.01 | 0.0001 | 63 | 870 | 64 | 2262 |
| B3 | 0.05 | 0.0005 | 65 | 880 | 66 | 2288 |
| B4 | 0.08 | 0.0008 | 66 | 904 | 67 | 2350 |
| B5 | 0.1 | 0.001 | 92 | 925 | 94 | 2405 |
| B6 | 0.5 | 0.005 | 94 | 930 | 96 | 2418 |
| B7 | 0.8 | 0.01 | 92 | 927 | 94 | 2410 |
| B8 | 1 | 0.05 | 93 | 924 | 95 | 2402 |
| B9 | 1.3 | 0.1 | 90 | 935 | 92 | 2431 |
| B10 | 1.5 | 0.15 | 89 | 930 | 91 | 2418 |
| B11 | 1.8 | 0.18 | 88 | 920 | 90 | 2392 |
| B12 | 2 | 0.2 | 87 | 910 | 89 | 2366 |

TABLE 2-continued

| Material | Electrolyte additive LiOH (wt %) | Al(OH)₃ (wt %) | Air battery P(%) | Discharge capacity (mAh) | Alkaline dry battery P(%) | Discharge capacity (mAh) |
|---|---|---|---|---|---|---|
| B13 | 2.5 | 0.25 | 67 | 883 | 68 | 2296 |
| B14 | 3 | 0.3 | 63 | 874 | 64 | 2272 |
| C1 | 0 | 0 | 48 | 868 | 49 | 2257 |
| C2 | 0.01 | 0.0001 | 65 | 878 | 66 | 2283 |
| C3 | 0.05 | 0.0005 | 67 | 888 | 68 | 2309 |
| C4 | 0.08 | 0.0008 | 68 | 912 | 69 | 2371 |
| C5 | 0.1 | 0.001 | 94 | 933 | 95 | 2426 |
| C6 | 0.5 | 0.005 | 96 | 938 | 97 | 2439 |
| C7 | 0.8 | 0.01 | 94 | 935 | 95 | 2431 |
| C8 | 1 | 0.05 | 95 | 932 | 96 | 2423 |
| C9 | 1.3 | 0.1 | 92 | 943 | 94 | 2452 |
| C10 | 1.5 | 0.15 | 91 | 938 | 93 | 2439 |
| C11 | 1.8 | 0.18 | 90 | 928 | 92 | 2413 |
| C12 | 2 | 0.2 | 89 | 918 | 91 | 2387 |
| C13 | 2.5 | 0.25 | 69 | 891 | 70 | 2317 |
| C14 | 3 | 0.3 | 65 | 882 | 66 | 2293 |

As is clear from Table 2, when LiOH and the aluminum compound are not added to the electrolyte, the P values of the air batteries are as low as 50% or less and the P values (%) of the alkaline dry batteries are also as low as 50% or less, in comparison with those when they are added. Although not shown in Table 2, when the electrolyte contains no aluminum compound and contains only LiOH, the aluminum in the zinc alloy dissolves in the electrolyte, thereby breaking the conductive film comprising Zn, O, and K. Also, when the electrolyte contains no LiOH and contains only the aluminum compound, a passivation film is formed on the zinc alloy surface. For these reasons, the P values (%) of both air batteries and alkaline dry batteries are as low as 50% or less.

As is clear from the above, in air batteries and alkaline dry batteries including as an active material a zinc alloy that contains at least aluminum, an alkaline electrolyte, and a positive electrode, the addition of LiOH and an aluminum compound to the alkaline electrolyte provides high discharge capacity on a high-rate discharge.

With respect to the amounts of LiOH and aluminum compound added, when the contents of LiOH and aluminum compound in the negative electrode mixture are lower than 0.1 wt % and 0.001 wt %, respectively, or higher than 2 wt % and 0.2 wt %, respectively, the P values (%) are in the 60% range. However, when the contents of LiOH and aluminum compound are 0.1 to 2 wt % and 0.001 to 0.2 wt %, respectively, the P values (%) are high, specifically 85% or more, which means that the high-rate discharge characteristics are excellent. Further, when the contents of LiOH and aluminum compound are 0.1 to 1 wt % and 0.001 to 0.05 wt %, respectively, the P values are high, specifically 92% or more, which means that the high-rate discharge characteristics are more preferable.

Note that the LiOH contents of 0.1 to 2 wt % in the negative electrode mixture correspond to 0.15 to 3 parts by weight per 100 parts by weight of the zinc alloy. Also, the aluminum compound contents of 0.001 to 0.2 wt % in the negative electrode mixture correspond to 0.0015 to 0.3 parts by weight per 100 parts by weight of the zinc alloy.

Also, if the amount of each element of Al, Bi, In, Ca, Sn, and Pb added to the zinc alloy used in the negative electrode is in the range of 20 ppm to 5000 ppm, gas production can be effectively prevented. If it is in the range of 50 ppm to 1000 ppm, gas production can be more effectively prevented.

Example 2

Next, using the alloy containing Al, Bi, and In in the negative electrode, air batteries and alkaline dry batteries were fabricated in the same manner as the above. Table 3 shows the electrolyte additives and the weight ratios of the electrolyte to the zinc alloy. It should be noted that in Example 1 the weight ratio of the electrolyte to the zinc alloy is 0.5.

These batteries were placed in a constant temperature oven at 20° C. and a relative humidity of 60%. The air batteries were discharged at a current of 165 mA, and the alkaline dry batteries were discharged at a current of 1050 mA, whereby the discharge capacity C1 was obtained. In the same manner as the above, the theoretical capacity C2 was calculated from the weight of Zn contained in the negative electrode of each battery, and the proportion P (%) of the discharge capacity C1 to the theoretical capacity C2 was calculated. Also, to obtain battery capacity, the air batteries were discharged at a current of 2 mA and the alkaline dry batteries were discharged at a current of 45 mA. Table 3 shows the results.

TABLE 3

| Material | Electrolyte additive LiOH (wt %) | Al(OH)₃ (wt %) | Electrolyte/ zinc alloy (weight ratio) | Air battery P(%) | Discharge capacity (mAh) | Alkaline dry battery P(%) | Discharge capacity (mAh) |
|---|---|---|---|---|---|---|---|
| A7 | 0.21 | 0.001 | 0.05 | 82 | 921 | 84 | 2579 |
| A7 | 0.21 | 0.001 | 0.08 | 85 | 923 | 87 | 2584 |
| A7 | 0.21 | 0.001 | 0.1 | 90 | 925 | 92 | 2590 |
| A7 | 0.21 | 0.001 | 0.8 | 91 | 925 | 93 | 2590 |
| A7 | 0.21 | 0.001 | 1.5 | 92 | 920 | 94 | 2576 |
| A7 | 0.21 | 0.001 | 2 | 93 | 910 | 95 | 2548 |
| A7 | 0.21 | 0.001 | 2.5 | 94 | 720 | 96 | 2016 |
| A7 | 0.21 | 0.001 | 3 | 94 | 500 | 96 | 1400 |
| B7 | 0.21 | 0.001 | 0.05 | 83 | 926 | 85 | 2592 |
| B7 | 0.21 | 0.001 | 0.08 | 86 | 928 | 88 | 2597 |
| B7 | 0.21 | 0.001 | 0.1 | 91 | 930 | 93 | 2603 |
| B7 | 0.21 | 0.001 | 0.8 | 92 | 930 | 94 | 2603 |
| B7 | 0.21 | 0.001 | 1.5 | 93 | 925 | 95 | 2589 |
| B7 | 0.21 | 0.001 | 2 | 94 | 915 | 96 | 2561 |
| B7 | 0.21 | 0.001 | 2.5 | 95 | 724 | 97 | 2026 |
| B7 | 0.21 | 0.001 | 3 | 95 | 503 | 97 | 1407 |
| C7 | 0.21 | 0.001 | 0.05 | 85 | 933 | 86 | 2612 |

TABLE 3-continued

| | Electrolyte additive | | Electrolyte/ | Air battery | | Alkaline dry battery | |
|---|---|---|---|---|---|---|---|
| | | | | | Discharge | | Discharge |
| Material | LiOH (wt %) | Al(OH)$_3$ (wt %) | zinc alloy (weight ratio) | P(%) | capacity (mAh) | P(%) | capacity (mAh) |
| C7 | 0.21 | 0.001 | 0.08 | 88 | 935 | 89 | 2618 |
| C7 | 0.21 | 0.001 | 0.1 | 93 | 937 | 94 | 2624 |
| C7 | 0.21 | 0.001 | 0.8 | 94 | 937 | 95 | 2624 |
| C7 | 0.21 | 0.001 | 1.5 | 95 | 932 | 96 | 2610 |
| C7 | 0.21 | 0.001 | 2 | 96 | 922 | 97 | 2581 |
| C7 | 0.21 | 0.001 | 2.5 | 97 | 729 | 98 | 2042 |
| C7 | 0.21 | 0.001 | 3 | 97 | 507 | 98 | 1418 |

As is clear from Table 3, when the weight ratio of the whole electrolyte to the zinc alloy is less than 0.1, the P values (%) of the air batteries and the alkaline dry batteries were in the 80% range, and when the weight ratio of the whole electrolyte to the zinc alloy is greater than 2, the discharge capacities of the air batteries and the alkaline dry batteries at the discharge currents of 2 mA and 45 mA, respectively, were not more than 750 mAh and not more than 2100 mAh, respectively.

This shows that when the weight ratio of the whole electrolyte to the zinc alloy is in the range of 0.1 to 2, the P values (%) of the air batteries and the alkaline dry batteries are good, specifically 90% or higher, and that the discharge capacities of the air batteries and the alkaline dry batteries at the discharge currents of 2 mA and 45 mA, respectively, are good, specifically not less than 900 mAh and not less than 2500 mAh, respectively. Further, when the weight ratio of the whole electrolyte to the zinc alloy is in the range of 0.1 to 0.8, batteries having higher capacity can be obtained.

Also, if the amount of each element of Al, Bi, In, Ca, Sn, and Pb added to the zinc alloy used in the negative electrode is in the range of 20 ppm to 5000 ppm, gas production can be effectively prevented. If it is in the range of 50 ppm to 1000 ppm, gas production can be more effectively prevented.

INDUSTRIAL APPLICABILITY

The present invention is applied to alkaline batteries, such as air batteries and alkaline dry batteries, that use an aluminum-containing zinc alloy as a negative electrode active material.

The invention claimed is:

1. An alkaline battery comprising: a negative electrode including a negative electrode mixture that contains a zinc alloy as an active material, said zinc alloy containing at least aluminum;
    an alkaline electrolyte; and
    a positive electrode, wherein said alkaline electrolyte comprises an aqueous KOH solution and LiOH and aluminum hydroxide that are dissolved in said aqueous KOH solution, wherein a portion of the alkaline electrolyte is contained in the negative electrode mixture,
    wherein the amounts of the LiOH and the aluminum hydroxide contained in the portion of the alkaline electrolyte in said negative electrode mixture are 0.1 to 2 wt % and 0.001 to 0.2 wt % of the negative electrode mixture, respectively; and
    wherein the positive electrode is an air electrode.

2. The alkaline battery in accordance with claim 1, wherein the weight ratio of the alkaline electrolyte to the zinc alloy of the negative electrode is 0.1 to 2.

* * * * *